United States Patent
Taylor et al.

(10) Patent No.: US 6,198,917 B1
(45) Date of Patent: Mar. 6, 2001

(54) SYSTEM AND METHOD OF OPERATION FOR CORRECTLY ROUTING LOCATION UPDATE SERVICE MESSAGES IN A CELLULAR DIGITAL PACKET DATA SYSTEM

(75) Inventors: Cecil L. Taylor; Patricia A. Landgren, both of Plano, TX (US)

(73) Assignee: Nortel Networks Ltd., Montreal (CA)

( * ) Notice: Subject to any disclaimer, the term of this patent is extended or adjusted under 35 U.S.C. 154(b) by 0 days.

(21) Appl. No.: 09/111,725

(22) Filed: Jul. 8, 1998

Related U.S. Application Data
(60) Provisional application No. 60/052,877, filed on Jul. 17, 1997.

(51) Int. Cl.[7] .................................................. H04B 1/00
(52) U.S. Cl. ......................................... 455/417; 455/432
(58) Field of Search .................................. 455/432, 435, 455/436, 437, 438, 439, 417, 445

(56) References Cited

U.S. PATENT DOCUMENTS

| | | | |
|---|---|---|---|
| 5,606,595 | * 2/1997 | Ejzak | 379/58 |
| 5,666,348 | * 9/1997 | Thornberg et al. | 370/230 |
| 5,696,760 | * 12/1997 | Hardin et al. | 370/252 |
| 5,956,645 | * 9/1999 | Harper et al. | 455/466 |
| 5,978,673 | * 11/1999 | Alperovich et al. | 455/417 |
| 6,002,932 | * 12/1999 | Kingdon et al. | 455/433 |
| 6,125,126 | * 9/2000 | Hallenstal | 370/522 |

* cited by examiner

Primary Examiner—Reinhard J. Eisenzopf
Assistant Examiner—Makoto Aoki
(74) Attorney, Agent, or Firm—Bruce E. Garlick; James A. Harrison (57) ABSTRACT

A method of updating mobility information for a Mobile End System (MES) in a Cellular Digital Packet Data network uniquely identifies a Serving Mobile Data Intermediate System (MDIS) in a ReDirect Request (RDR) so that the Location Update Service (LUS) can complete its location updating operations. Upon attachment of the MES to the Serving MDIS, a RDR is created that includes a LUS address of the Serving MDIS and a Forwarding Service address (FSA) of the Serving MDIS. The RDR is then transmitted to a Home MDIS corresponding to the MES via a network backbone. The Forwarding Service address of the MES is then updated to the Forwarding Service address of the Serving MDIS. Then, the Home MDIS creates an RDC that includes as a destination address the LUS address of the Serving MDIS and transmits to the RDC to the Serving MDIS via the network backbone. Once the LUS operations are complete, data intended for the MES received at the Home MDIS is routed based upon the FSA of the Serving MDIS. The data is received by the Home MDIS and routed via a Mobile Data Base Station to the MES. In an alternate operation, the LUS address of the Serving MDIS is not appended to the RDR by the Serving MDIS but is be appended to the RDR by an Intermediate MDIS should the RDR be routed to the Home MDIS by way of an intermediate MDIS. When the Intermediate MDIS receives the RDR, it determines that it is not the Home MDIS and appends the LUS address to the RDR. The Intermediate MDIS then transmits the RDR to the Home MDIS.

21 Claims, 5 Drawing Sheets

SYSTEM AND METHOD OF OPERATION FOR CORRECTLY ROUTING LOCATION UPDATE SERVICE MESSAGES IN A CELLULAR DIGITAL PACKET DATA SYSTEM

CROSS-REFERENCE TO RELATED APPLICATION

The present application claims priority pursuant to 35 U.S.C. Sec. 119(e) to U.S. Provisional application Ser. No. 60/052,877, filed Jul. 17, 1997, pending, which is hereby incorporated herein by reference in its entirety.

BACKGROUND

1. Technical Field

The present invention relates generally to Cellular Digital Packet Data (CDPD) networks; and more particularly to a system and method of operation in which a mobile network location protocol (MNLP) operates to correctly route Location Update Service (LUS) messages within a CDPD network.

2. Related Art

A CDPD network is a wireless wide-area data network (WAN) that enhances the services provided by cellular carriers by supporting packet based data transfer operations. It is based on the Internet Protocol (IP) and is designed to minimize the impact on network software by requiring no changes to the higher network protocols. In its most basic form, a CDPD network can be used as a wireless extension of an existing TCP/IP network. It allows mobile workstations to talk to host computers to retrieve information such as stock inventory, dispatched messages, or location information. CDPD is the standard packet communications architecture for the North American cellular telecommunications industry and is currently being deployed in Canada, the United States and Mexico.

A CDPD network typically includes a plurality of Mobile Data Base Stations (MDBSs), a plurality of Mobile Data Intermediate Systems (MDISs), a network backbone, a Network Administrative Support System (NASS) and a Network Control Center (NCC). Together, the components of the CDPD network support communications with Mobile End Systems (MESs). The NASS and the NCC provide management functions for the CDPD network.

MESs allow subscribers of the CDPD network to gain access to wireless communications provided by the CDPD network. An MES can be any mobile computing device which has a CDPD modem installed or attached to it. An MES can support several types of features. For example, some MESs support CDPD access only and others have dual mode (circuit switched and CDPD) access. Some MESs provide integrated cellular voice and data capabilities along with PSTN connectivity.

The MDBS is Radio Frequency (RF) equipment that is located at a cell site that supports RF communications between an MES and an MDIS and manages communications across the radio channels. Each MDIS may support multiple MDBSs. The location of each MDBS is based on engineering analysis of coverage topology and data traffic loading predications, optimized for both off-peak and busy hour traffic conditions.

The MDIS is the central switching fabric for the CDPD network. The MDIS has primary responsibility for providing mobility management and packet routing to ensure data is exchanged with MESs as they traverse the various MDBSs comprising the network. The MDIS couples to the network backbone and passes all traffic via the network backbone. The network backbone is typically comprised of standard IP routers and networking equipment to support network management and security. The network backbone may couple to external data networks via a router. For example, the CDPD network may couple to the Internet, public and private packet switched networks and other networks that provide data transfer functions.

The CDPD network provides Network Layer services to applications riding over it. Applications riding upon the CDPD network include IP applications and Connectionless Network Protocol (CLNP) applications among others. The CDPD network is compatible with the well known International Standards Organization (ISO) Reference Model for Open Systems Interconnection. To support IP based applications and CLNP applications, among others, the CDPD network provides the Network Layer services transparently to the applications riding above the Network Layer. As compared to the non-mobile operations of IP networks, the CDPD services MESs that roam throughout the CDPD network, connecting to differing local MDBSs during such roaming.

The Mobility Network Location Protocol (MNLP) was developed to provide the Network Layer support in the CDPD network. The MNLP facilitates mobility within the CDPD network, locating MESs within the CDPD network and routing packet data to and from the MESs. Consistent with the MNLP, the Location Update Service (LUS) and the Forwarding Service (FS) provide Network Layer support within the CDPD to locate the MESs within the CDPD network and to deliver packet data to the MESs once their location is determined. However, the LUS and the FS are distinct services within the ISO Reference Model and must maintain their isolation from one another so as not to violate proper network protocol practice.

Each MES has an associated "Home" MDIS. All packet data intended for a particular MES supported by the CDPD network is routed to its Home MDIS. The Home MDIS then routes the packet data via the network backbone to a "Serving" MDIS that currently serves the MES. The Serving MDIS then routes the packet data via an appropriate MDBS to the MES. For packet data transmissions emanating from the MES, the Serving MDIS routes the packet data according to an associated destination address, but not necessarily via the Home MDIS.

As the MES moves about the CDPD network, the LUS is employed to notify the Home MDIS of the current Serving MDIS. For example, when an MES first operates within an area served by a particular MDIS, the MES attaches to an MDBS serviced by the MDIS. When the MES attaches to the MDBS, the Serving MDIS uses the LUS to send a ReDirect Request (RDR) to the Home MDIS which directs the Home MDIS to direct all further packet data to the Serving MDIS. Upon receipt, the Home MDIS updates its routing tables and sends a ReDirect Confirmation (RDC) to the Serving MDIS. Then, all subsequent packet data received by the Home MDIS intended for the MES is routed by a Forwarding Service (FS) to the Serving MDIS for delivery via a serviced MDBS.

However, during some operations, the LUS fails to properly register a redirection. When the RDR is routed via an "Intermediate" MDIS to the Home MDIS, the LUS loses the LUS address of the Serving MDIS. Such is the case because the RDR of the LUS only carries the FS address of the Serving MDIS, which oftentimes differs from the LUS address of the Serving MDIS. If the Home MDIS issues an RDC using the FS address of the Serving MDIS, the RDC may fail to reach the Serving MDIS. Resultantly, the CDPD network does not forward data intended for the MES to the Serving MDIS.

Thus, there is a need in the art for a system and an associated method of operation wherein the Home MDIS can properly identify the LUS address of the Serving MDIS when the LUS routes the RDR from the Serving MDIS to the Home MDIS via an Intermediate MDIS.

SUMMARY OF THE INVENTION

Thus, in order to overcome the above described shortcomings, among others, a method of updating mobility information for a MES in a Cellular Digital Packet Data network uniquely identifies a Serving MDIS in a RDR so that the LUS can complete its location updating operations. Upon attachment of the MES to the Serving MDIS, a RDR is created that includes a LUS address of the Serving MDIS and a Forwarding Service address of the Serving MDIS. The RDR is then transmitted to a Home MDIS corresponding to the MES via a network backbone.

The Forwarding Service address of the MES is then updated to the Forwarding Service address of the Serving MDIS. Then, the Home MDIS produces an RDC that includes as a destination address the LUS address of the Serving MDIS and transmits the RDC to the Serving MDIS. Once the LUS operations are complete, data intended for the MES received at the Home MDIS is routed to the Serving MDIS based upon the FSA of the Serving MDIS. The data is received by the Serving MDIS and routed to the MES via a corresponding MDBS.

In an alternate operation, the LUS address of the Serving MDIS is not appended to the RDR by the Serving MDIS. When an Intermediate MDIS receives the RDR, it deternines that it is not the Home MDIS and appends the LUS address to the RDR. The Intermediate MDIS then transmits the RDR to the Home MDIS. In this manner, when the Serving MDIS routes the RDR directly to the Home MDIS, and the Home MDIS can recognize the Serving MDIS based upon the Source LUS address of the Serving MDIS, such appended additional LUS address of the Serving MDIS is not required. However, when the RDR is routed via at least one Intermediate MDIS, the LUS address of the Serving MDIS is required and appended to the RDR.

Operation according to the present invention provides important benefits not provided by the prior devices. Because the LUS address of the Serving Mobile Data Intermediate System is appended to the RDR, the Home Mobile Data Intermediate System may prepare and deliver the RDC without systematic error. Such benefit is particularly important when the Forwarding Service address of the Serving Mobile Data Intermediate System differs from the LUS address of the Serving Mobile Data Intermediate System. While, in some cases, these addresses may be common, determining the LUS address of the Serving MDIS based upon the FSA of the Serving MDIS would require protocol layer piercing which is inconsistent with ISO Reference Model for Open Systems Interconnection operations. Further, in many operations, these addresses differ from one another. In this case, use of the FSA of the Serving MDIS would provide no benefit whatsoever.

Moreover, other aspects of the present invention will become apparent with further reference to the drawings and specification which follow.

DETAILED DESCRIPTION OF THE DRAWINGS

Figure 1:
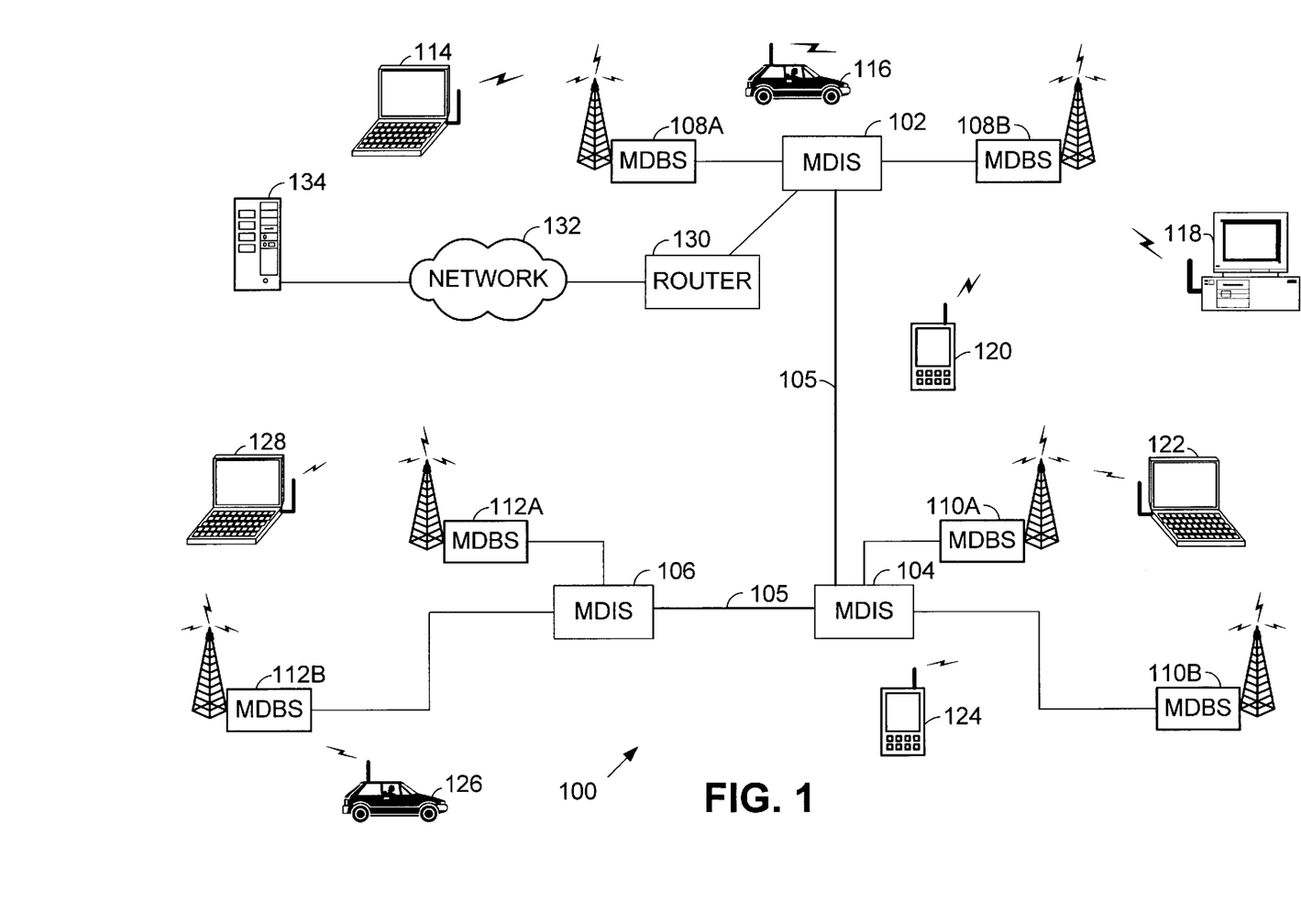
FIG. 1 is a system diagram illustrating a CDPD network constructed according to the present invention in which Serving MDIS address information is appended to RDR messages.

FIG. 1 illustrates a CDPD network 100 constructed according to the present invention in which Serving MDIS address information is appended to RDR messages. The CDPD network includes MDISs 102, 104 and 106 which are coupled by a network backbone 105. Each MDIS 102, 104 and 106 serves a plurality of MDBSs. In the CDPD network 100 illustrated, MDIS 102 serves MDBSs 108A and 108B, MDIS 104 serves MDBSs 110A and 110B and MDIS 106 serves MDBSs 112A and 112B. In combination, then, the MDISs 102, 104 and 106 and the MDBSs 108A, 108B, 110A, 110B, 112A and 112B provide CDPD communication capability within a corresponding service area.

The CDPD network 100 provides data communication services to MESs 114, 116, 118, 120, 122, 124, 126 and 128. As shown, the MESs comprise various types of devices, some of which are simply data units, but other of which provide functions in addition to data services. Laptop computers 114, 122 and 128 couple to the CDPD network 100 via CDPD modems installed within PCMCIA slots of the computers. Desktop computer 118 includes a CDPD modem that connects to the computer 118 via a PC bus or the like. Hand-held data units are constructed to provide both data communication and processing functions as well as voice communication functions. Automobiles 116 and 126 couple to the CDPD network 100 to receive navigation and Internet connectivity functions, for example.

Router 130 couples MDIS 102 to a network 132. Coupled to the network 132 is a server computer 134. The network 132 may be any of a number of various types of public or private networks that support data transmissions. For example, the network 132 may be the Internet, a Frame Relay network, an Asynchronous Transfer Mode (ATM) network or another publicly available network. The network 132 may also be a private network such as a Local Area Network (LAN), a Wide Area Network (WAN) or another private network capable of supporting data transfer functions. The server computer 134 supports at least one application programs that interacts with the MESs 114–128 to transfer data over the network 132 and the CDPD network 100. Thus, the CDPD network, in conjunction with the network 132, support communications between the server computer 134 and the MESs 114–128.

The CDPD network 100 operates according to standard CDPD protocols and operations. However, the CDPD network 100 provides additional functions according to the present invention that enable the LUS to properly track locations of MESs within the CDPD network 100. For example, suppose that MDIS 102 is designated as the Home MDIS for MES 128. When MES 128 attaches to MDIS 106, MDIS 106 becomes the Serving MDIS for the MES 128 and the MES 128 prepares and issues a RDR using the LUS. The LUS routes the RDR via the network backbone 105 to MDIS 104, an "Intermediate" MDIS. Intermediate MDIS 104 then forwards the RDR to MDIS 102, the Home MDIS for MES 128. Other Intermediate MDISs may also form a portion of the path between the Serving MDIS 106 and the Home MDIS 102.

According to prior techniques, the Home MDIS 102 for MES 128 may presume that Intermediate MDIS 104 was the Serving MDIS for MES 128. Such presumption would be incorrect. Based upon this incorrect presumption, the Home MDIS 102 would prepare an RDC and direct the RDC either to the Intermediate MDIS 104 or a non-existant MDIS. The Serving MDIS 106 would never receive the RDC and, on that basis, would not support communications with the MES 128.

Thus, according to the present invention, the LUS address of the Serving MDIS 106 is appended to the RDR, either by the Serving MDIS 106 or an Intermediate MDIS 104. Upon receipt of the RDR, the Home MDIS 102 extracts the LUS address of the Serving MDIS 106 from the RDR and uses the LUS address of the Serving MDIS 106 as the destination LUS address of the RDC. The Home MDIS 102 then transmits the RDC on the network backbone 105. Based upon the destination LUS, the RDC is properly routed to the Serving MDIS 106 and operation of the FS proceeds correctly based upon the completed RDR and RDC transaction.

Figure 2:
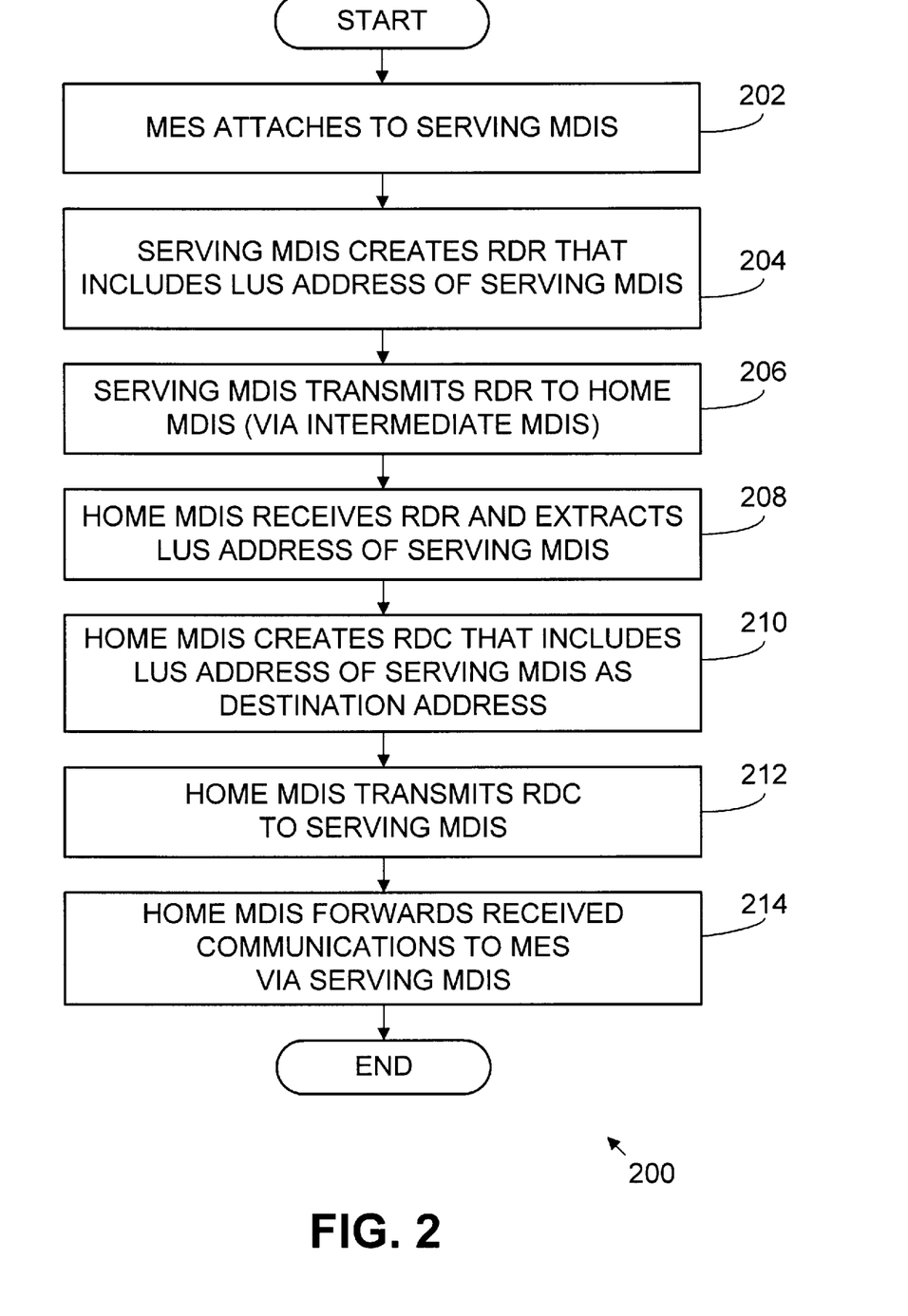
FIG. 2 is a logic diagram illustrating a method of providing Serving MDIS information to a Home MDIS so that data may be properly routed in a CDPD network to the Serving MDIS.

FIG. 2 is a logic diagram illustrating a method for providing Serving MDIS information to a Home MDIS so that data may be properly routed in a CDPD network. Operation commences at step 202 where an MES attaches to a Serving MDIS. Such operation may occur at power-up, upon roaming into a cell serviced by the MDIS or upon such other operation that would cause the MDIS to determine that the MES presently commenced operation in a portion of a CDPD network served by the MDIS. At step 204, the Serving MDIS creates an RDR that includes the LUS address of the Serving MDIS. The Serving MDIS then transmits the RDR upon the network backbone at step 206. While the RDR may pass directly to the Home MDIS of the particular MES without routing via an Intermediate MDIS, the RDR may be routed via one or more Intermediate MDISs, as was previously described with reference to FIG. 1.

The Home MDIS receives the RDR at step 208 and extracts the LUS address of the Serving MDIS from the RDR. The Home MDIS then uses the LUS address contained in the RDR to create an RDC at step 210. Once the RDC has been created at step 210, the Home MDIS transmits the RDC to the Serving MDIS on the network backbone at step 212. The Serving MDIS receives the RDC and continues operation accordingly, having determined that the LUS has successfully configured the system to route all CDPD communications received at the Home MDIS for the MES to the Serving MDIS. Then, the Home MDIS operates according to the redirect operations to forward all CDPD communications received to the MES via the Serving MDIS at step 214.

Figure 3:
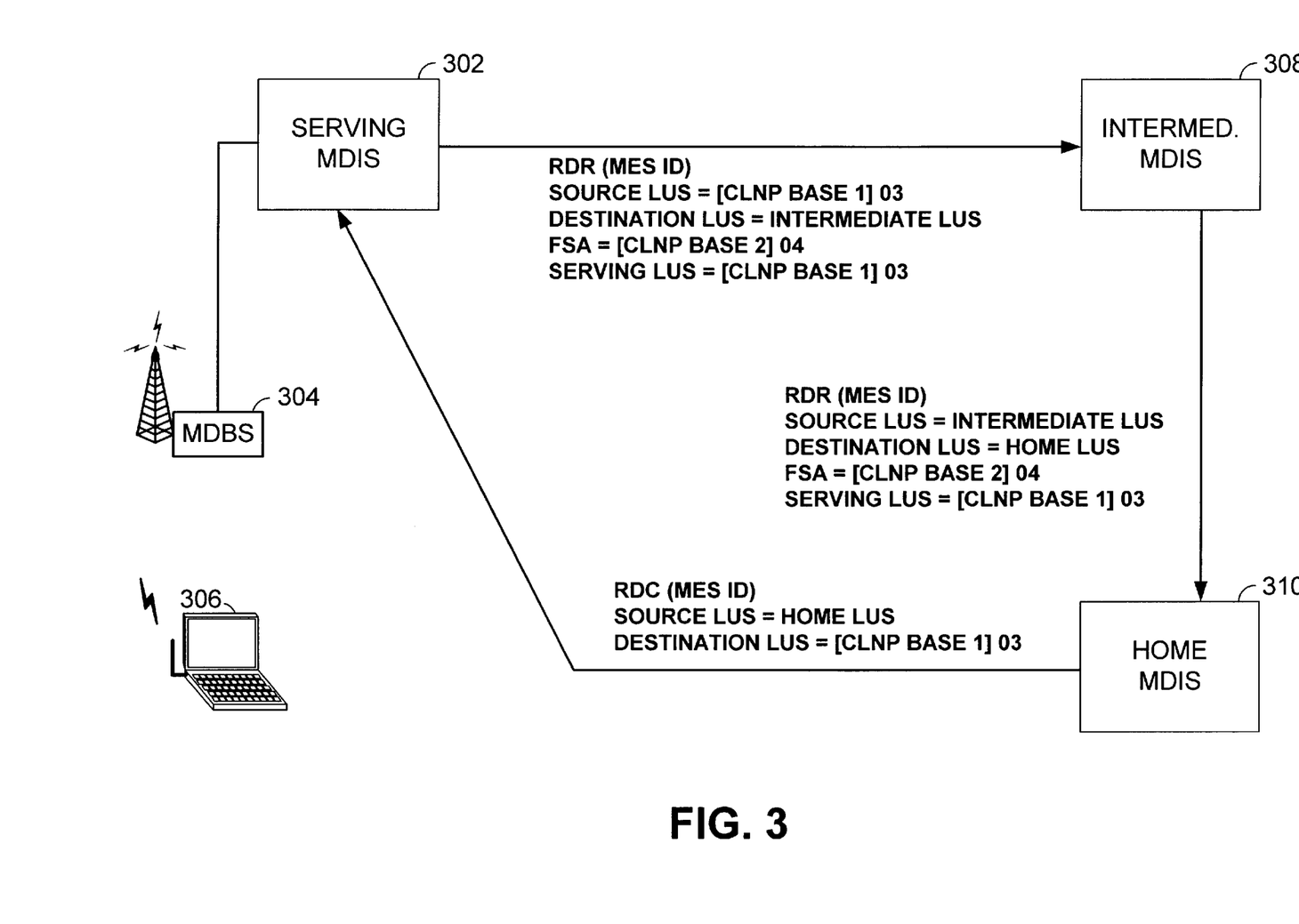
FIG. 3 is a partial system diagram illustrating the flow of information within a CDPD network in conjunction with RDR and RDC messages according to the method of FIG. 2.

FIG. 3 is a partial system diagram illustrating the flow of information in a CDPD network within RDR and RDC messages according to the method of FIG. 2. As shown, a Serving MDIS 302 couples to a serving MDBS 304 which provides service to MES 306. Upon attachment of the MES 306 to the Serving MDIS 302, the Serving MDIS 302 creates an RDR. The RDR includes the identity of the MES 306 (MES ID) for which the RDR is generated. The RDR, as transmitted from the Serving MDIS 302, also includes the Serving MDIS 302 LUS Address [CLNP Base 1] as the Source LUS Address, the Intermediate MDIS 308 LUS Address as the Destination LUS Address and the FSA address of the Serving MDIS 302 LUS [CLNP BASE 2] as the FSA address.

According to the present invention, the RDR also includes the LUS Address of the Serving MDIS 302 as the Serving LUS Address. Because the FSA Address and the LUS Address of the Serving MDIS 302 are typically not the same, by appending the LUS Address of the Serving MDIS 302 to the RDR and causing the Home MDIS 310 to receive such LUS Address, location update operations may proceed without error. The LUS Address of the Serving MDIS 302 may be included in the RDR in various manners. In one embodiment, a parameter code (e.g., 0A), a parameter length (e.g., 20 octets) and a parameter value (20-byte CLNP address of the Serving MDIS 302 LUS) are chosen and form a part of the RDR.

After creating the RDR, the Serving MDIS 302 transmits the RDR on the network backbone to the Intermediate MDIS 308. The Intermediate MDIS 308 receives the RDR, determines that it does not serve the MES 308 and reformats the RDR so that the RDR will be received by the Home MDIS 310. In the reformatted RDR, the Source LUS Address is set to the LUS Address of the Intermediate LUS 308. Further, the Destination LUS Address is set to the LUS Address of the Home MDIS 310. The Intermediate MDIS 308 then transmits the reformatted RDR to the Home MDIS 310. As will be appreciated, additional Intermediate MDISs may serve to route the RDR from the Serving MDIS 302 to the Home MDIS 310. For simplicity, a single Intermediate MDIS 308 was shown.

Upon its receipt, the Home MDIS 310 determines that it serves the Home MDIS functions for the MES 306. The Home MDIS 310 then updates the FSA Address for the MES 306 to the FSA Address contained in the RDR [CLNP Base 2] corresponding to the FSA Address of the Serving MDIS 302. The Home MDIS 310 then generates an RDC which includes the identity of the MES 306, the LUS Address of the Home MDIS 310 as the Source LUS Address and the LUS Address of the Serving MDIS 302 as the Destination LUS Address (as determined from the Serving LUS Address contained in the RDR). The Home MDIS 310 then transmits the RDC on the network backbone and, based upon the Destination LUS Address contained in the RDC, the RDC is routed via the network backbone to the Serving MDIS 302. Operation of the CDPD network then proceeds according to the FS update to route data from the Home MDIS 310 to the Serving MDIS 302.

Figure 4:
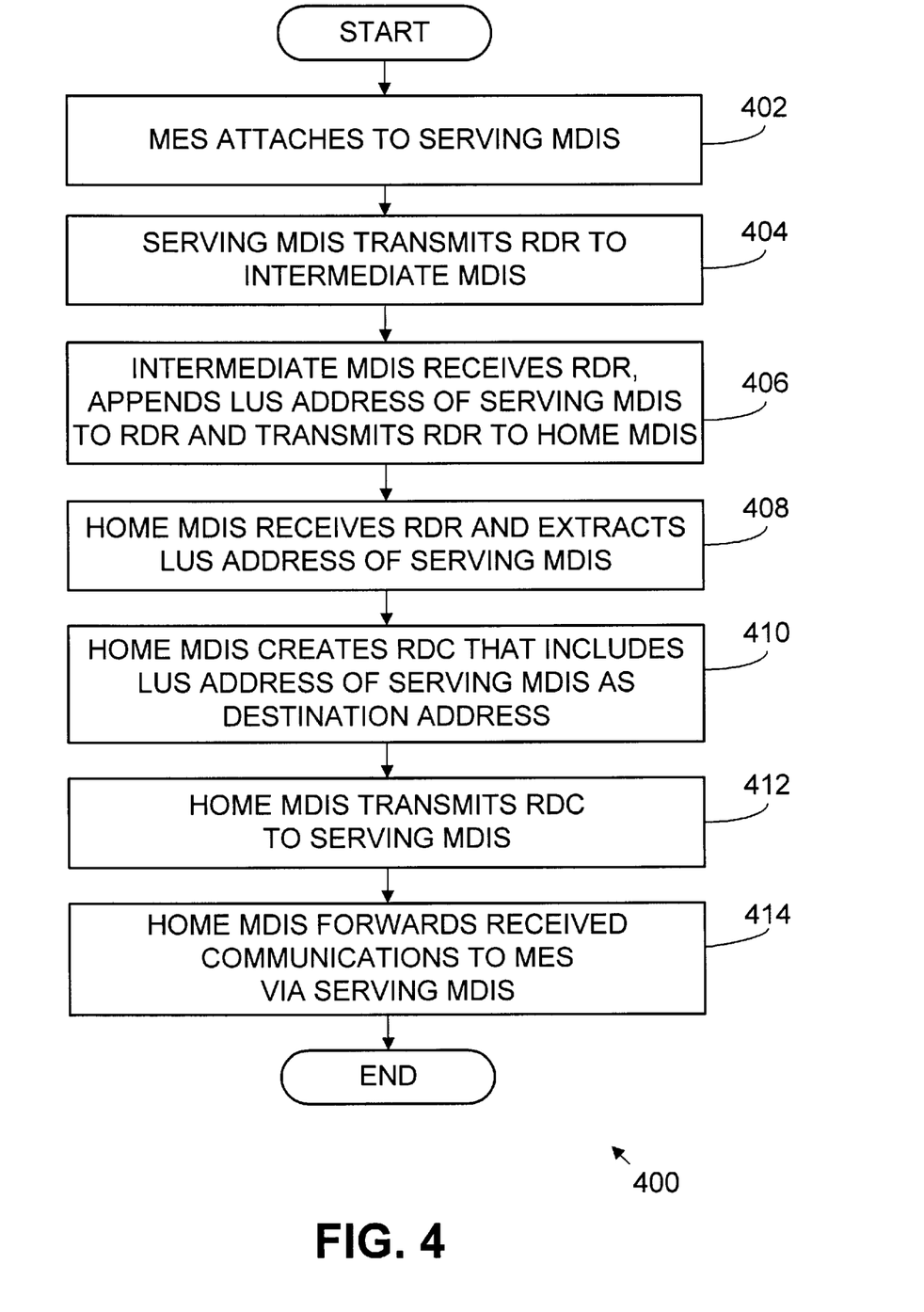
FIG. 4 is a logic diagram illustrating an alternate embodiment of a method of providing Serving MDIS information to a Home MDIS within an RDR so that data may be properly routed in a CDPD network to the Serving MDIS.

FIG. 4 is a logic diagram illustrating an alternate embodiment of a method 400 of providing Serving MDIS information to a Home MDIS so that data may be properly routed within a CDPD network. As contrasted to the method 200 described with reference to FIG. 2, the method 400 of FIG. 4 does not append the Serving LUS Address to the RDR until it is determined that the RDR does not pass directly from the Serving MDIS to the Home MDIS.

Operation commences at step 402 wherein the MES attaches to the Serving MDIS. The Serving MDIS then creates the RDR and transmits the RDR to an Intermediate MDIS at step 404 via the network backbone. The Intermediate MDIS receives the RDR, determines that it is not the Home MDIS for the MES, appends the LUS Address of the Serving MDIS to the RDR and transmits the RDR to the Home MDIS at step 406. The Home MDIS receives the RDR at step 408 and extracts the LUS Address of the Serving MDIS from the RDR.

At step 410, the Home MDIS then creates an RDC that includes the LUS Address of the Serving MDIS as its destination address. The Home MDIS then transmits this RDC to the Serving MDIS via the network backbone. The Serving MDIS receives the RDC and commences forwarding operations for data received from the Home MDIS at step 414. Data forwarding operations continue at step 414 until the MES is no longer serviced by the Serving MDIS.

Figure 5:
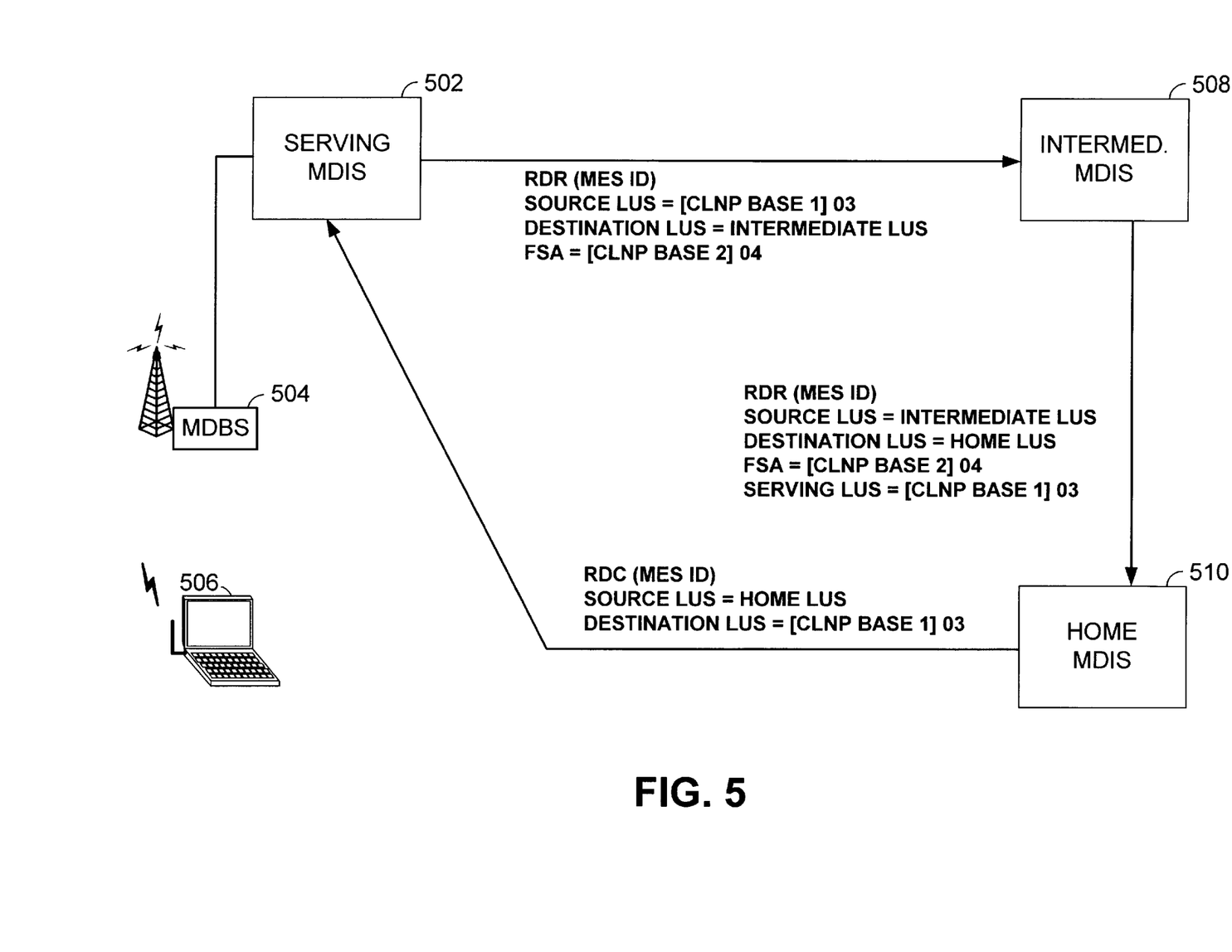
FIG. 5 is a partial system diagram illustrating the flow of information within a CDPD network in conjunction with RDR and RDC messages according to the method of FIG. 4.

FIG. 5 is a partial system diagram illustrating the flow of information in a CDPD network according to the method of FIG. 4. As shown, MES 506 is served by MDBS 504 and Serving MDIS 502. Upon attachment of MES 506, Serving MDIS 502 generates an RDR and transmits the RDR to the Intermediate MDIS 508. However, as contrasted to the RDR created by the Serving MDIS 302 of FIG. 3, the RDR created by the Serving MDIS 502 of FIG. 5 does not include a parameter identifying the LUS Address of the Serving MDIS 502.

After creating the RDR, the Serving MDIS 502 transmits the RDR on the network backbone to the Intermediate MDIS 508. The Intermediate MDIS 508 receives the RDR from the Serving MDIS 502 and determines it is not the Home MDIS for MES 506. Based upon this determination, the Intermediate MDIS 508 determines that it must append the LUS Address of the Serving MDIS 502 to the RDR (which was present in the RDR received from the Serving MDIS 502). The Intermediate MDIS 508 appends the LUS Address of the Serving MDIS 502 (as determined from the Source LUS Address of the RDR) and reformats the RDR to alter the Source LUS and Destination LUS Addresses.

In the reformatted RDR, the Source LUS Address is set to the LUS Address of the Intermediate LUS 508. Further, the Destination LUS Address is set to the LUS Address of the Home MDIS 510. The Intermediate MDIS 508 then transmits the reformatted RDR to the Home MDIS 510. As will be appreciated, additional Intermediate MDISs may serve to route the RDR from the Serving MDIS 502 to the Home MDIS 510. For simplicity, a single Intermediate MDIS 508 was shown.

Upon receipt of the RDR, the Home MDIS 510 determines that it serves as the Home MDIS for the MES 506. The Home MDIS 510 then updates the FSA Address for the MES 506 to the FSA Address contained in the RDR [CLNP Base 2]. Further, the Home MDIS 510 generates an RDC which includes the identity of the MES 506, the LUS Address of the Home MDIS 510 as the Source LUS Address and the LUS Address of the Serving MDIS 502 as the Destination LUS Address (as determined from the Serving LUS Address contained in the RDR). Based upon these addresses, the network backbone and the MDISs route the RDC to the Serving MDIS 502. Operations then proceed according to these messages to route, via the FS, data from the Home MDIS 510 to the Serving MDIS 502.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In a Cellular Digital Packet Data network, a method of updating mobility information for a Mobile End System, the method comprising:

upon the attachment of the Mobile End System to the Serving Mobile Data Intermediate System, creating a redirect request that includes a Location Update Service address of the Serving Mobile Data Intermediate System and a Forwarding Service address of the Serving Mobile Data Intermediate System;

transmitting the redirect request to a Home Mobile Data Intermediate System corresponding to the Mobile End System via a network backbone;

updating a Forwarding Service address of the Mobile End System to the Forwarding Service address of the Serving Mobile Data Intermediate System;

creating a redirect confirmation that includes as a destination address the Location Update Service address of the Serving Mobile Intermediate System; and transmitting the redirect confirmation to the Serving Mobile Intermediate System.

2. The method of claim 1, further comprising routing data intended for the Mobile End System based upon the Forwarding Service Address corresponding to the Mobile End System.

3. The method of claim 1, wherein transmitting the redirect request to a Home Mobile Data Intermediate System corresponding to the Mobile End System via a network backbone comprises:

transmitting the redirect request from the Serving Mobile Data Intermediate System to an Intermediate Mobile Data Intermediate System; and transmitting the redirect request from the Intermediate Mobile Data Intermediate System to the Home Intermediate Data Intermediate System, the redirect request including the Forwarding Service address of the Serving Mobile Data Intermediate System.

4. The method of claim 3, wherein the Location Update Service address of the Serving Mobile Data Intermediate System is appended to the redirect request at the Intermediate Mobile Data Intermediate System.

5. The method of claim 1, wherein the Location Update Service address of the Serving Mobile Data Intermediate System is appended to the redirect request at the Serving Mobile Data Intermediate System.

6. The method of claim 1, wherein the Forwarding Service address of the Serving Mobile Data Intermediate System differs from the Location Update Service address of the Serving Mobile Data Intermediate System.

7. The method of claim 1, wherein the Cellular Digital Packet Data network operates in compliance with a Cellular Digital Packet Data Standard Specification.

8. In a Cellular Digital Packet Data network, a method of forwarding data received at a Home Mobile Data Intermediate System to a Mobile End System, the method comprising:

upon the attachment of the Mobile End System to the Serving Mobile Data Intermediate System, creating a redirect request that includes a Location Update Service address of the Serving Mobile Data Intermediate System and a Forwarding Service address of the Serving Mobile Data Intermediate System;

transmitting the redirect request to a Home Mobile Data Intermediate System corresponding to the Mobile End System via a network backbone;

updating a Forwarding Service address of the Mobile End System to the Forwarding Service address of the Serving Mobile Data Intermediate System;

creating a redirect confirmation that includes as a destination address the Location Update Service address of the Serving Mobile Intermediate System;

transmitting the redirect confirmation to the Serving Mobile Intermediate System; and forwarding data received at a Home Mobile Data Intermediate System for the Mobile End System to the Serving Mobile Data Intermediate System for delivery via a Mobile Data Base Station.

9. The method of claim 8, further comprising routing the data intended for the Mobile End System based upon the Forwarding Service Address corresponding to the Mobile End System.

10. The method of claim 8, wherein transmitting the redirect request to a Home Mobile Data Intermediate System corresponding to the Mobile End System via a network backbone comprises:

transmitting the redirect request from the Serving Mobile Data Intermediate System to an Intermediate Mobile Data Intermediate System; and transmitting the redirect request from the Intermediate Mobile Data Intermediate System to the Home Intermediate Mobile Data Intermediate System.

11. The method of claim 10, wherein the Location Update Service address of the Serving Mobile Data Intermediate System is appended to the redirect request at the Intermediate Mobile Data Intermediate System.

12. The method of claim 8, wherein the Location Update Service address of the Serving Mobile Data Intermediate System is appended to the redirect request at the Serving Mobile Data Intermediate System.

13. The method of claim 8, wherein the Forwarding Service address of the Serving Mobile Data Intermediate System differs from the Location Update Service address of the Serving Mobile Data Intermediate System.

14. The method of claim 8, wherein the Cellular Digital Packet Data network operates in compliance with a Cellular Digital Packet Data Standard Specification.

15. A Cellular Digital Packet Data network providing data service to a Mobile End System, the Cellular Digital Packet Data network comprising:

a plurality of Mobile Data Base Stations;

a plurality of Mobile Data Intermediate Systems coupled via a network backbone, each of the Mobile Data Intermediate Systems coupled to at least one Mobile Data Base Station;

upon the Mobile End System attaching to a Serving Mobile Data Intermediate System of the plurality of Mobile Data Intermediate Systems, the Serving Mobile Data Intermediate System creating a redirect request that includes a Location Update Service address of the Serving Mobile Data Intermediate System and a Forwarding Service address of the Serving Mobile Data Intermediate System;

the Serving Mobile Data Intermediate System transmitting the redirect request to a Home Mobile Data Intermediate System corresponding to the Mobile End System of the plurality of Mobile Data Intermediate Systems via the network backbone;

the Home Mobile Data Intermediate System updating a Forwarding Service address of the Mobile End System to the Forwarding Service address of the Serving Mobile Data Intermediate System;

the Home Mobile Data Intermediate System creating and transmitting a redirect confirmation that includes as a destination address the Location Update Service address of the Serving Mobile Intermediate System; and the Home Mobile Data Intermediate System forwarding data intended for the Mobile End System to the Serving Mobile Data Intermediate System for delivery via a respective Mobile Data Base Station.

16. The Cellular Digital Packet Data network of claim 15, further comprising routing communications intended for the Mobile End System based upon the Forwarding Service Address corresponding to the Mobile End System.

17. The Cellular Digital Packet Data network of claim 15, further comprising:

an Intermediate Mobile Data Intermediate System of the plurality of Mobile Data Intermediate Systems; and the Intermediate Mobile Data Intermediate System receiving the redirect request from the Intermediate Mobile Data Intermediate System and transmitting the redirect request to the Home Intermediate Mobile Data Intermediate System.

18. The Cellular Digital Packet Data network of claim 17, wherein the Location Update Service address of the Serving Mobile Data Intermediate System is appended to the redirect request at the Intermediate Mobile Data Intermediate System.

19. The Cellular Digital Packet Data network of claim 15, wherein the Location Update Service address of the Serving Mobile Data Intermediate System is appended to the redirect request at the Serving Mobile Data Intermediate System.

20. The Cellular Digital Packet Data network of claim 15, wherein the Forwarding Service address of the Serving Mobile Data Intermediate System differs from the Location Update Service address of the Serving Mobile Data Intermediate System.

21. The Cellular Digital Packet Data network of claim 15, wherein the Cellular Digital Packet Data network operates in compliance with a Cellular Digital Packet Data Standard Specification.

* * * * *